United States Patent
Kelly et al.

(10) Patent No.: US 10,320,612 B2
(45) Date of Patent: Jun. 11, 2019

(54) METHOD AND APPARATUS FOR PROVIDING AUTOMATIC NODE CONFIGURATION USING A DONGLE

(71) Applicants: James Kelly, Tinley Park, IL (US); Michael Krupicka, Naperville, IL (US)

(72) Inventors: James Kelly, Tinley Park, IL (US); Michael Krupicka, Naperville, IL (US)

(73) Assignee: TeLLABS OPERATIONS, INC., Naperville, IL (US)

( * ) Notice: Subject to any disclaimer, the term of this patent is extended or adjusted under 35 U.S.C. 154(b) by 818 days.

(21) Appl. No.: 14/310,764

(22) Filed: Jun. 20, 2014

(65) Prior Publication Data

US 2015/0372866 A1   Dec. 24, 2015

(51) Int. Cl.
*H04L 12/24* (2006.01)
*H04L 12/26* (2006.01)

(52) U.S. Cl.
CPC ...... *H04L 41/0886* (2013.01); *H04L 43/0817* (2013.01); *H04L 43/50* (2013.01)

(58) Field of Classification Search
CPC .. H04L 41/0886; H04L 43/0817; H04L 43/50
See application file for complete search history.

(56) References Cited

U.S. PATENT DOCUMENTS

| | | | | |
|---|---|---|---|---|
| 6,021,033 A * | 2/2000 | Benham | ...................... | F21S 8/00 361/1 |
| 6,104,717 A * | 8/2000 | Coile | ...................... | H04L 12/24 370/352 |
| 6,581,166 B1 * | 6/2003 | Hirst | ...................... | H04L 69/40 714/4.4 |
| 2004/0102917 A1* | 5/2004 | Chen | ................... | G06F 11/2221 702/120 |
| 2004/0225459 A1* | 11/2004 | Krishnaswamy | .. | G01R 31/3183 702/57 |
| 2005/0045726 A1* | 3/2005 | Terlizzi | ............... | G06F 13/4022 235/454 |
| 2007/0104110 A1* | 5/2007 | Dang | ................... | H04L 12/2697 370/245 |
| 2007/0299622 A1* | 12/2007 | Smith | ...................... | H04B 3/23 702/90 |
| 2011/0095767 A1* | 4/2011 | Motter | ................... | H04L 12/462 324/539 |
| 2012/0089872 A1* | 4/2012 | Bartenstein | ......... | G06F 11/2205 714/33 |
| 2013/0297976 A1* | 11/2013 | McMillen | ............. | G06F 11/079 714/43 |
| 2015/0301544 A1* | 10/2015 | Lonvick | .................. | H04L 67/12 700/297 |

* cited by examiner

*Primary Examiner* — Chirag Shah
*Assistant Examiner* — Joshua Smith
(74) *Attorney, Agent, or Firm* — James M. Wu; JW Law Group

(57) ABSTRACT

A network element ("NE") is capable of starting an automatic configuration in response to an initiator such as a dongle. In one embodiment, after resetting a counter used for identifying a signal, a process for the automatic configuration forces a first test signal at a test mode output ("TMO") pin of a console interface to a logic state zero. Upon detecting a break condition at a receiver pin, a second test signal at the TMO pin is forced to a logic state one. When logic state one is detected at the receiver pin of the NE, an automatic configuration mode at the NE is activated.

18 Claims, 9 Drawing Sheets

(I/O direction with respect to Dongle)

US 10,320,612 B2

METHOD AND APPARATUS FOR PROVIDING AUTOMATIC NODE CONFIGURATION USING A DONGLE

FIELD

The exemplary embodiment(s) of the present invention relates to telecommunications network. More specifically, the exemplary embodiment(s) of the present invention relates to automatic node configuration.

BACKGROUND

A network environment typically includes hundreds and thousands of network nodes and/or devices, such as routers, hosts, hubs, and switches, configured to deliver information using, for example, packets or packet flows between source devices and destination devices. Information, content, and/or payload carried by packet(s) travelling through the network is generally transmitted and/or routed to its destinations via various nodes. Each network node typically includes one or more network elements and is configured to route packets and/or packet flows to their destinations.

With increasing demand for more information, such as audio, video, and data, to be supplied to homes and/or businesses, many network providers constantly upgrade, add, fix, and/or enhance their network capabilities and capacities to meet the demand. To maintain and/or upgrade an existing network, network elements ("NEs") are continuously added, replaced, and/or upgraded at the nodes. When a new network device or NE is added or replaced at a node, the node, for example, is typically required to reboot to reconfigure the node before it can provide network services.

A problem associated with configuring and/or reconfiguring a node or NE is that it takes time, equipment, and/or resources to properly configure/reconfigure a node. For example, to configure an NE or node, a trained network operator connects a host console to a node and enters a configuration, reconfiguration, or provision command(s) at the command line of host console to initiate a configuration and/or provision of the node or box.

A conventional approach to improve the process of device configuration is to instruct a node or NE to enter a self-rebooting, self-discovery, or auto-configuration mode, where a host console may need to be connected to the command line interface of the node for activating the auto-configuration mode.

SUMMARY

A process capable of initiating an automatic node reconfiguration using a plug, connector, or dongle is illustrated. In one embodiment, upon receiving a serial communication connector such as a dongle that contains multiple pins with two pins such as $1^{st}$ pin and $6^{th}$ pin electrically connected, a logic state zero test signal is sent to the serial communication connector from a test mode output ("TMO") pin of the node to the first pin of the connector. After detecting a break condition at the receiver pin of the node in response to the test signal, a logic state one test signal is subsequently sent to the serial communication connector. If the high signal is detected at the receiver pin of the node which verifies the presence of a dongle, automatic configuration is activated. The break condition may be when a logic state zero is at the receiver pin for a time period, for example, greater than for a character length. Similarly, the high test signal may be detected when a logic state one is at the receiver pin for a time period, for example, greater than for a character length. The dongle, in one aspect, is a serial communication connector or plug, such as a registered jack 45 ("RJ45"), six electrical contacts with six positions ("6C6P") connector, RJ50, Thunderbolt™ connector, USB™ connector, et cetera.

In operation, the process includes clearing a counter that may be set to count, for example, the number of break conditions. After forcing the test mode output ("TMO") pin of console interface to a logic state zero, the counter increments if a break condition is detected at the receiver pin of the console interface. Upon forcing the TMO pin to a logic state one, an automatic configuration mode is subsequently activated at the NE when the logic state one is detected at the receiver pin of the NE. A presence of an initiator or dongle is verified when a logic state zero test signal followed by a logic state one test signal are detected consecutively.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
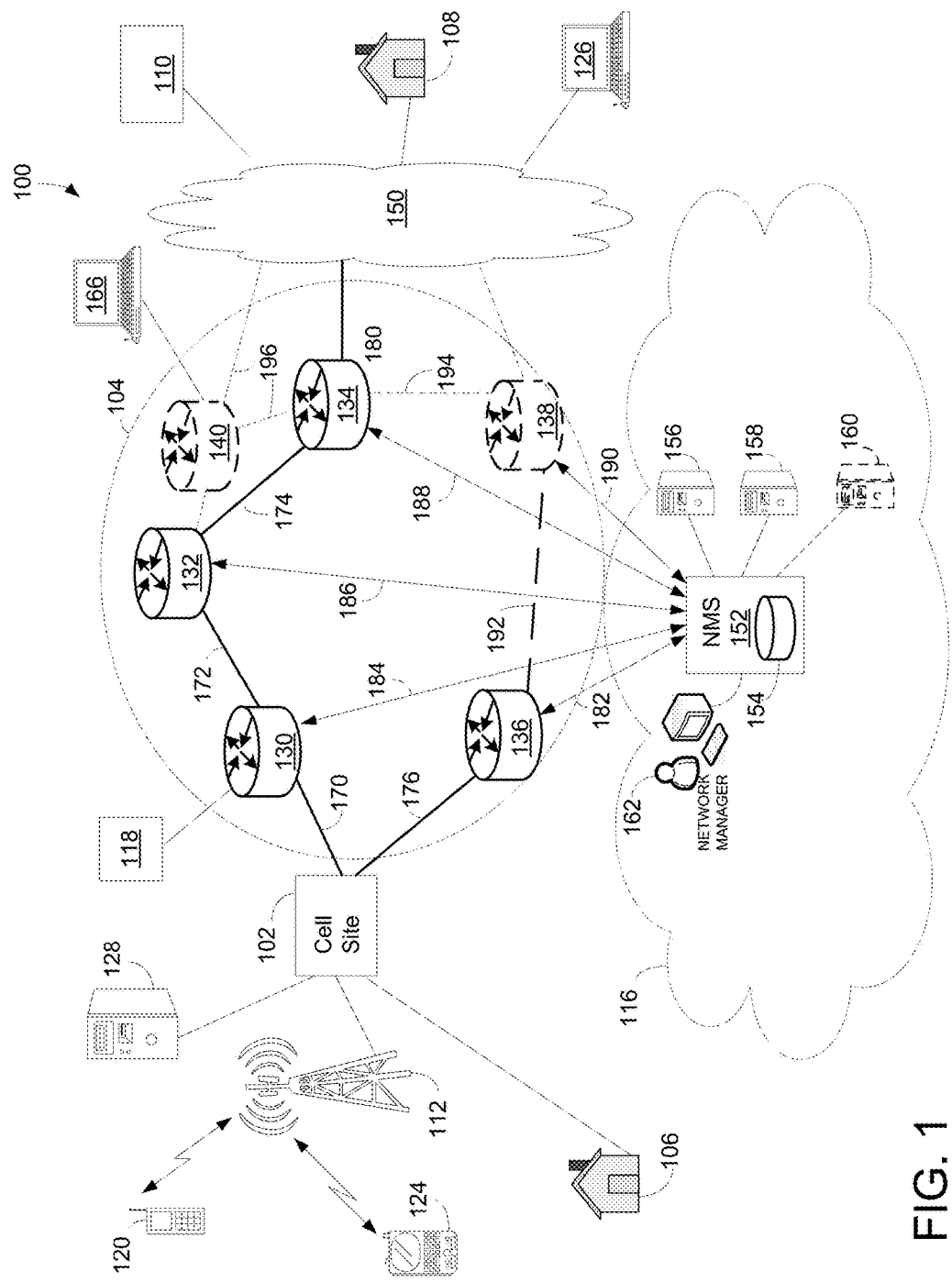
FIG. 1 is a block diagram illustrating a computing network having multiple network nodes configured to route network traffics in accordance with one embodiment of the present invention.

Exemplary embodiment(s) of the present invention describe here in the context of a method and/or apparatus for activating an automatic node reconfiguration via an automatic configuration (or auto-configuration) mode using a dongle.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, switch elements, switches, routers, networks, computer and/or communication devices or mechanisms, or combinations of components thereof that handle information whether in digital form or analog form. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets, frames, or cells, such as ATM (Asynchronous Transfer Mode) type, on a transport medium, for example, the TCP/IP or UDP/IP type. The IP network may also include a satellite network, such as, for example, a DVB-RCS (Digital Video Broadcasting-Return Channel System) network or a SDMB (Satellite Digital Multimedia Broadcast) network, a terrestrial network, such as, for example, a cable (xDSL) network or a mobile or cellular network, or a hybrid satellite/terrestrial network.

One embodiment of the present invention illustrates a method capable of initiating an automatic node reconfiguration using a plug, connector, or dongle. For instance, upon receiving a serial communication connector such as a dongle that contains multiple pins with two pins such as $1^{st}$ pin and $6^{th}$ pin electrically connected, a logic state zero test signal is sent to the serial communication connector from a test mode output ("TMO") pin of the node to the first pin of the connector. After detecting a break condition at the receiver pin of the node in response to the test signal, a logic state one test signal is subsequently sent to the serial communication connector. If the logic state one signal is detected at the receiver pin of the node which verifies the presence of a dongle, an automatic configuration is activated. The dongle, in one aspect, is a serial communication connector or plug, such as a registered jack 45 ("RJ45"), six electrical contacts with six positions ("6C6P") connector, RJ50, Thunderbolt™ connector, USB™ connector, et cetera.

While some embodiments of the invention describe using a dongle for a serial communication port, the invention need not be so limited. A dongle for a parallel communication port may also be used where output data are looped back as corresponding input data. Much of the descriptions below will refer to serial communication port for ease of description.

FIG. 1 is a block diagram 100 illustrating a computing network having multiple network nodes configured to route network traffics in accordance with one embodiment of the present invention. Diagram 100 includes a cell site 102, a switching network 104, a central office ("CO") 116, and Internet 150. Internet 150 is further coupled to various users such as user 108, content provider 110, and portable device 126. CO 116 provides network management to facilitate network communication between users 106-108 via switching network 104, Internet 150, and cell site 102. It should be noted that the underlying concept of the exemplary embodiment(s) of the present invention would not change if one or more nodes (or devices) were added to or removed from diagram 100.

Cell site 102 is capable of communicating with mobile devices such as cellular phone 120 and handheld device 124 via radio tower 112. It should be noted that cell site 102 may include additional radio towers as well as other land based switching circuitry. The cell stations such as cell site 102 can be configured to support wireless communications as well as wired communications.

Switching network 104 is capable of transporting or routing information (for example, packets) between users and/or providers connected to the network. In one embodiment, network 104 includes network elements ("NEs") 130-140 which are also known as nodes and/or routers. An NE, as a logical network entity, is able to manage one or more physical network devices. The physical network devices include routers, modems, hubs, bridges, servers, switches, et cetera. NEs 130-140 are interconnected via connections 170-176 and are used for routing information to and from network clients and/or hosts. Network client in one example may include one or more routers, switches, hosts, users, base stations, and the like. For example, switching network 104 may use NEs 130-134 to route a packet stream from users 106 to 108 via cell site 102 and Internet 150.

NEs 130-140, in one aspect, are routers, switches, bridges, or a combination of routers, switches, and bridges. The total number of NEs used in switching network 104 may increase or decrease over time depending on the demand of network services. For example, with increasing demand of video streaming, the number of NEs as illustrated in diagram 100 can grow to meet such demand. One aspect of network growth is to add additional NEs into an existing pool of NEs to expand processing and/or service capacity. For instance, NEs 138-140 are recently added NEs to the pool of NEs 130-136 for enhancing routing or processing capacities. Dotted lines of NEs 138-140 as well as connections 192-196 illustrate that they are newly added or will be added. The number of NEs can grow into hundreds or thousands depending on the network service demand.

When a new node or NE such as NE 140 is added to switching network 104, NE 140 needs to be reconfigured or provisioned. To activate an auto-configuration mode, a computer 166, for example, is coupled to the console interface of NE 140 whereby computer 166 can instruct NE 140 to enter the auto-configuration mode. Once the auto-configuration is completed, NE 140 is rebooted and is ready to route the network traffic. Alternatively, a dongle 118, in one aspect, can be used to initiate the auto-configuration mode. One benefit of using a dongle or a communication connector is that it simplifies the activating process, especially when a node or NE is situated on the top of a pole or structure.

Dongle 118, in one embodiment, can be an RJ45 plug with $1^{st}$ pin and $6^{th}$ pin electrically coupled or tied together. The $1^{st}$ pin of console interface of NE 130, for example, is the test mode output ("TMO") pin and $6^{th}$ (sixth) pin of console interface is the receiver pin. When dongle 118 is plugged into a console interface of NE 130, the NE 130 may, for example, proceed to verify dongle 118 by sending test signals and initiates an auto-configuration mode once the presence of dongle 118 is verified.

When user 106 sends a packet or packets to user 108, the packet as a portion of network traffic travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed and monitored. To monitor network performance, CO 116, for example, deploys a network management system ("NMS") 152 or other performance monitoring system to monitor status of switching network 104 based on statistics generated by NEs such as NEs 130-140.

CO 116 includes NMS 152, computers or servers 156-158, and network administrator 162. NMS 152 further includes automatic node configuration ("auto-configuration") module 154, which, for example, includes a database storing as well as distributing auto-configuration to various NEs 130-140. Computers or servers 156-158 can be any types of digital processing servers, personal computers ("PCs"), workstations, et cetera, that may form a pool (or cluster) of servers capable of scaling up or down processing capacity in response to the number of NEs in switching network 104.

Figure 2:
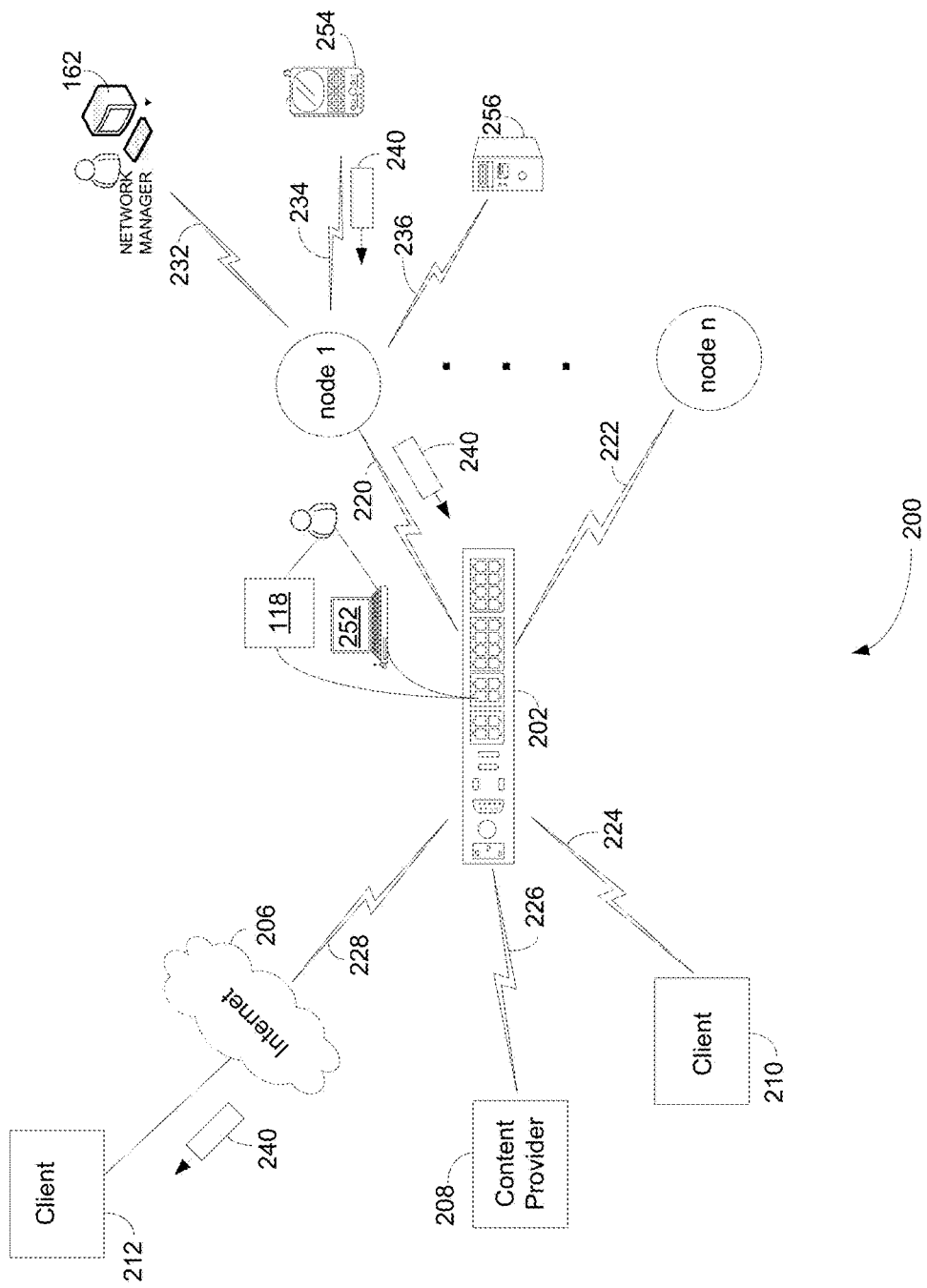
FIG. 2 is a block diagram illustrating an exemplary network node having a network device or NE able to enter an automatic configuration mode in accordance with one embodiment of the present invention.

FIG. 2 is a block diagram 200 illustrating an exemplary node having a network device or NE able to enter an auto-configuration mode in accordance with one embodiment of the present invention. Diagram 200 includes a network device 202, content provider 208, clients 210-212, and network nodes. Network device 202, in one aspect, is a node including one or more NEs. Network device 202, in one example, can also be a network management system ("NMS") used to manage routing network traffic. Network nodes include node 1 through node n wherein n is an integer number. Node 1, for example, can be a network entity capable of coupling to network manager 162, portable device 254, and server 256 via connections 232-236. It should be noted that the underlying concept of the exemplary embodiment(s) of the present invention would not change if one or more nodes (or devices) were added to or removed from diagram 200.

Network device 202, which can be a router or switch, is configured to direct or route network traffic between nodes and/or clients 210-212. A network manager or administrator 162 is able to communicate with network device 202 via node 1. Network device 202 is able to provide routing services to remote clients such as client 212 via Internet 206. Connections 220-228, which can be wired, wireless, or a combination of wired and wireless cables or connections, are employed to connect nodes and clients 210-212. Note that client(s) can be servers, routers, switches, computers, user's equipments, network equipments, network elements, websites, and so forth.

Network device 202, in one aspect, performs a function of a network hub capable of routing packet flows between various NEs. A packet flow, for example, is a packet or a packet stream traveling through a network. At any given time, hundreds or thousands of packets or packet streams may be traveling through a network simultaneously. A function of network hub is to monitor, inspect, and route packet streams between clients and nodes. For example, a portable handheld device 254 sends a flow 240 to client 212 via node 1. When router 202 detects flow 240 at its port connected to connection 220, router 202 identifies the destination addresses from the header of flow 240, flow 240 is subsequently sent by router 202 via its port connected to connection 228. Flow 240 will reach its destination via Internet 206.

To properly provide network service, each network node such as NE 202 requires continuous monitoring, maintaining, and updating in accordance with the network condition and traffic loading. To maintain and/or update nodes such as NE 202, network operator(s) needs to communicate with the target node such as NE 202. NE 202, for example, provides various ports capable of providing communication between NE 202 and the operator via one or more intermediary equipments such as dongles and/or console systems.

NE or network device 202, in one example, includes various sockets configured to receive various types of communication plugs or connectors. The sockets, in one aspect, includes different types of standard communication protocols, such as RJ45 serial communication connectors, Thunderbolt™ plugs, USB™ RS232 plugs, and the like. The sockets, in one embodiment, include at least one console socket which is used to provide command line interface. The console socket, for example, can be used to communicate with a dongle or a console system thereby allowing an administrator to access network device 202.

In one embodiment, a console socket is used to communicate with an auto-configuration initiator, such as dongle 118. Dongle 118, in one embodiment, is configured to be a special wired RJ45 wherein the $1^{st}$ (first) pin and the $6^{th}$ (sixth) pin of RJ45 are electrically connected. To activate an auto-configuration of network device 202, dongle 118, for example, is plugged into the console socket to activate the auto-configuration or self-discovery process.

During operation, instead of plugging in a system console 252, an operator plugs in a dongle 118 into the console interface at network device 202. Device 202 may recognize that a dongle 118 may have been plugged in. This may be due to the dongle 118 sending the logic state zero signal at the TMO pin to the receiver pin, and thus causing, for example, the device 202 to increment the number of break conditions detected. To verify the presence of dongle 118, the process resets a counter that keeps count of the number of break conditions detected and sends a logic state zero signal via the TMO pin which is connected to the $1^{st}$ pin of the dongle 118. Upon detecting a break condition at the receiver pin at the console interface, NE 202 detects potential dongle presence. To verify the presence of dongle, NE 202 clears the counter that may keep count of the number of break conditions detected and sends a second test signal at the TMO pin with a logic state one. After detecting a logic state one at the receiver pin of NE 202, the presence of the dongle 118 is verified. Upon verification of the dongle 118, an auto-configuration mode is activated at NE 202.

One advantage of using a dongle instead of a system console is that the dongle simplifies the initiation process of auto-configuration to reprogram or reboot NE 202. This may be useful, for example, when the node resides at a physically challenging place such as top of a pole.

Figure 3:
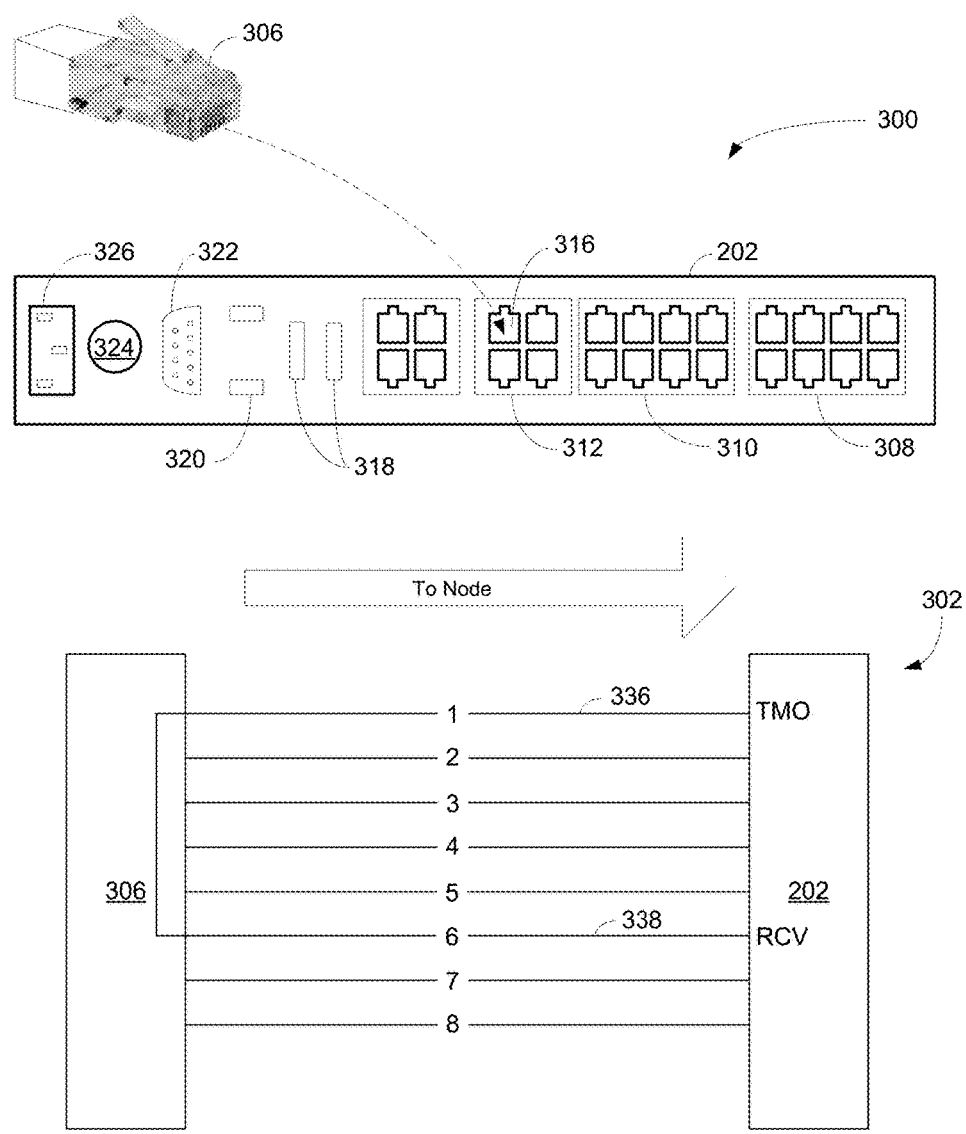
FIG. 3 illustrates block diagrams showing a network element coupled to a dongle and able to initiate an automatic node configuration in accordance with one embodiment of the present invention.

FIG. 3 illustrates block diagrams 300-302 showing an NE coupled to a dongle in accordance with one embodiment of the present invention. Diagram 300, in one aspect, includes a dongle 306 and a network device or NE 202. NE 202, in one example, includes output sockets 308, input sockets 310, console sockets 312, USB™ sockets 318, Thunderbolt™ sockets 320, RS232 female socket 322, and a power connection 326. NE 202 also includes a power switch 324. It should be noted that the underlying concept of the exemplary embodiment(s) of the present invention would not change if one or more blocks (or devices) were added to or removed from diagram 300.

Dongle 306, in one embodiment, is an RJ45 standard plug wherein the 1st (first) pin and the $6^{th}$ (sixth) pin are electrically coupled by a wire or a connection. When dongle 306 is plugged into a console socket 316 of NE 202, the $1^{st}$ pin of dongle 306, in one embodiment, is connected to the TMO pin of console socket 316 while the $6^{th}$ pin of dongle 306 is coupled to the receiver pin of console socket 316. Because the $1^{st}$ pin and the $6^{th}$ pin of dongle 306 are electrically connected, NE 202 is able to receive a test signal at the receiver pin within a predefined time after issuing the test signal at the TMO pin, as shown in diagram 302. Note that the predefined time may be, for example, the period for a character in a communication protocol appropriate for the serial communication used.

For example, when NE 202, which is able to control the TMO pin, issues a logic state zero test signal at the TMO pin (or $1^{st}$ pin), NE 202 should receive the logic state zero test signal at the receiver pin ($6^{th}$ pin) within a predefined time. During an operation, when the logic state zero test signal travels to the $1^{st}$ pin of dongle 306 via transmission wire 336 as shown in diagram 302, the test signal is redirected to the $6^{th}$ pin of dongle 306 via transmission wire 338 which allows the test signal to be detected as a break condition at the receiver pin of NE 202.

In an alternative embodiment, a network configuration includes node 202, dongle 306, and a connection such as a wire. Node 202, containing one or more NEs, guides network traffic traveling through the node. Node 202 has at least one console socket 316 for command line interface and various other sockets used for housing communication plugs for transmitting and receiving the network traffic. Console socket 316 is able to engage with a serial communication connector such as dongle 306 for providing command line communication. Dongle 306 is configured to facilitate serial communication and can be inserted into console socket 316. Dongle 306, in one embodiment, includes one pin such as $1^{st}$ pin configured to couple to the TMO pin of node 202 and another pin such as $6^{th}$ pin configured to couple to the receiver pin of node 202. The connection, capable of conducting electrical signal, is configured to couple two pins such as $1^{st}$ and $6^{th}$ pins of dongle 306. Dongle 306, in one embodiment, is an RJ45 having a wire electrically connecting two pins such as $1^{st}$ pin and $6^{th}$ pin.

An exemplary solution to initiate an automatic node reconfiguration is to use a dongle. Dongle 306, for example, is a male RJ45 connector that can fit into a female RJ45 socket on node 202. While the $1^{st}$ (first) pin is tied to the $6^{th}$ (sixth) pin of dongle 306, the $1^{st}$ (first) pin of dongle 306 corresponds to the TMO pin on node 202 and $6^{th}$ pin corresponds to the receive side on node 202. Note that other pin assignment is possible. For example, if the TMO pin is on the $2^{nd}$ pin of console socket of node 202 and the receiver pin is on the $3^{rd}$ pin of console socket of node 202, the $2^{nd}$ and $3^{rd}$ pins of dongle will tie together for facilitating auto-configuration mode.

To detect a dongle, node 202 initializes the TMO pin to a logic state zero. If dongle 306 is connected to node 202, the TMO pin is connected to the receiver pin of node 202. A break condition will be created at the receiver pin of node 202 when the test signal with zero value is pulsed. As a safety measure, the software module or code verifies the presence of dongle by clearing the break condition and set the TMO pin to a logic state one. If the receiver pin of node 202 receives the logic state one in response to the test signal, the presence or connection of dongle is verified. If, however, a break condition occurs again, it indicates that something other than the dongle is connected to the system.

Figure 4:
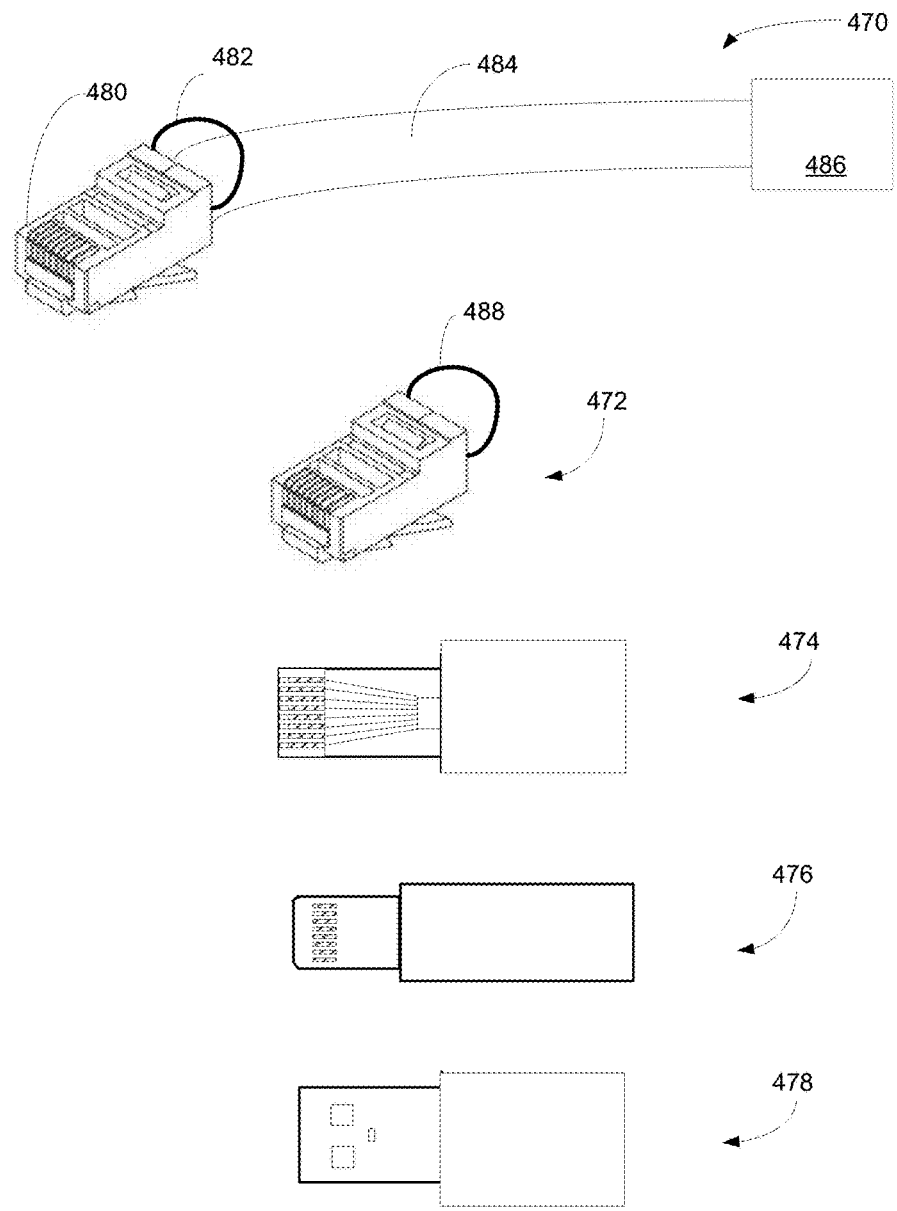
FIG. 4 illustrates exemplary dongles capable of initiating an automatic node configuration in accordance with one embodiment of the present invention.

FIG. 4 illustrates exemplary dongles 470-478 capable of initiating auto-configuration in accordance with one embodiment of the present invention. Dongle 470, in one embodiment, includes an RJ45 plug 480, a wire 482, a cable 484, and an end piece 486. Wire 482 is used to electrically couple the $1^{st}$ (first) pin of RJ45 plug 480 to the $6^{th}$ (sixth) pin of RJ45 plug 480. Alternatively, end piece 486 may be selectively coupled the first pin of RJ45 plug 480 to the sixth pin of RJ45 plug 480.

Dongle 472 illustrates a simplified version of RJ45 plug with a connecting wire 488 used to couple the $1^{st}$ (first) pin of RJ45 plug to the $6^{th}$ (sixth) pin of RJ45 plug. Dongle 474 illustrates an alternative configuration of RJ45. Dongle 476 employs Thunderbolt™ plug while dongle 478 uses a USB™ plug, where each dongle is for use with an appropriate socket at a node.

Figure 5:
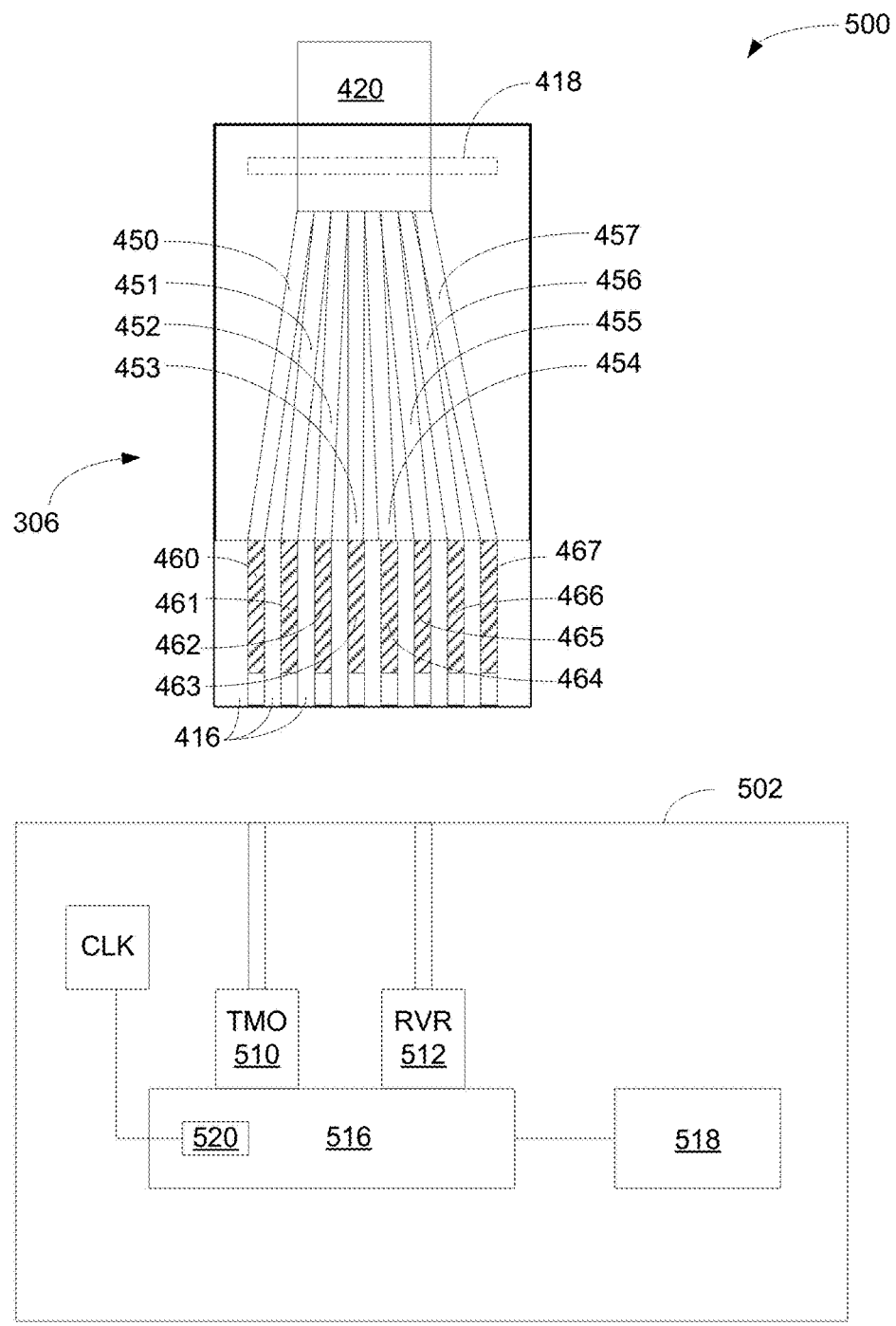
FIG. 5 illustrates exemplary RJ45 dongles coupled to a network router capable of initiating an automatic node configuration in accordance with one embodiment of the present invention.

FIG. 5 is a block diagram 500 illustrating an exemplary RJ45 dongle coupled to a network router capable of initiating an auto-configuration in accordance with one embodiment of the present invention. Diagram 500 includes an RJ45 dongle 306 logically coupled to a router 502 wherein router 502, which can be similar to node 202 illustrated in FIG. 2, includes an RJ45 socket able to receive dongle 306. It should be noted that the underlying concept of the exemplary embodiment(s) of the present invention would not change if one or more blocks (or devices) were added to or removed from diagram 400.

RJ45 dongle 306, in one embodiment, is an electrical plug having eight (8) position 416 and eight (8) contact 460-467 ("8P8C") modular connector and configured to have a dimension in compliance with a predefined 8P8C socket installed at router 502 for signal transfer between dongle 306 and router 502. Depending on the applications, eight contacts 460-467 are coupled to eight wires 450-457 wherein a portion of wires 450-457 are used for communication while another portion of wires 450-457 may be used for coupling with each other such as coupling $1^{st}$ (first) and $6^{th}$ (sixth) pins. Note that anchoring devices 418-420 are used to anchor wires 450-457 to RJ45 dongle 306. In one aspect, the $1^{st}$ (first) pin 460 and the $6^{th}$ (sixth) pin 465 are electrically connected, although not explicitly shown in FIG. 5.

Router 502, in one embodiment, includes a dongle detector 516, auto-configuration module 518, and a system clock. Dongle detector 516, which can be software, hardware, and/or a combination of software and hardware, is coupled to TMO pin 510 and a receiver pin 512. Dongle detector 516 further includes a counter 520 which is used to detect a break condition at receiver pin 512. For example, the counter 520 may keep count of break conditions at receiver pin 512.

The dongle 306 when plugged in to the router 502 may receive a logic state zero signal from the TMO pin 510 and route that signal back to the router 502 via the receiver pin 512. The dongle detector 516 may then detect that a dongle 306 may have been plugged in by, for example, querying from the counter 520 the number of break conditions detected.

When pin 460 of dongle 306 is coupled to TMO pin 510 of router 502 and pin 465 of dongle 306 is coupled to receiver pin 512 of router, router 502 will see or read a test signal almost immediately after the test signal is sent via TMO pin 510 since pin 460 and pin 465 are connected. Upon verifying the presence of a dongle, router 502 enters an auto-configuration mode facilitated by auto-configuration module 518.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 6:
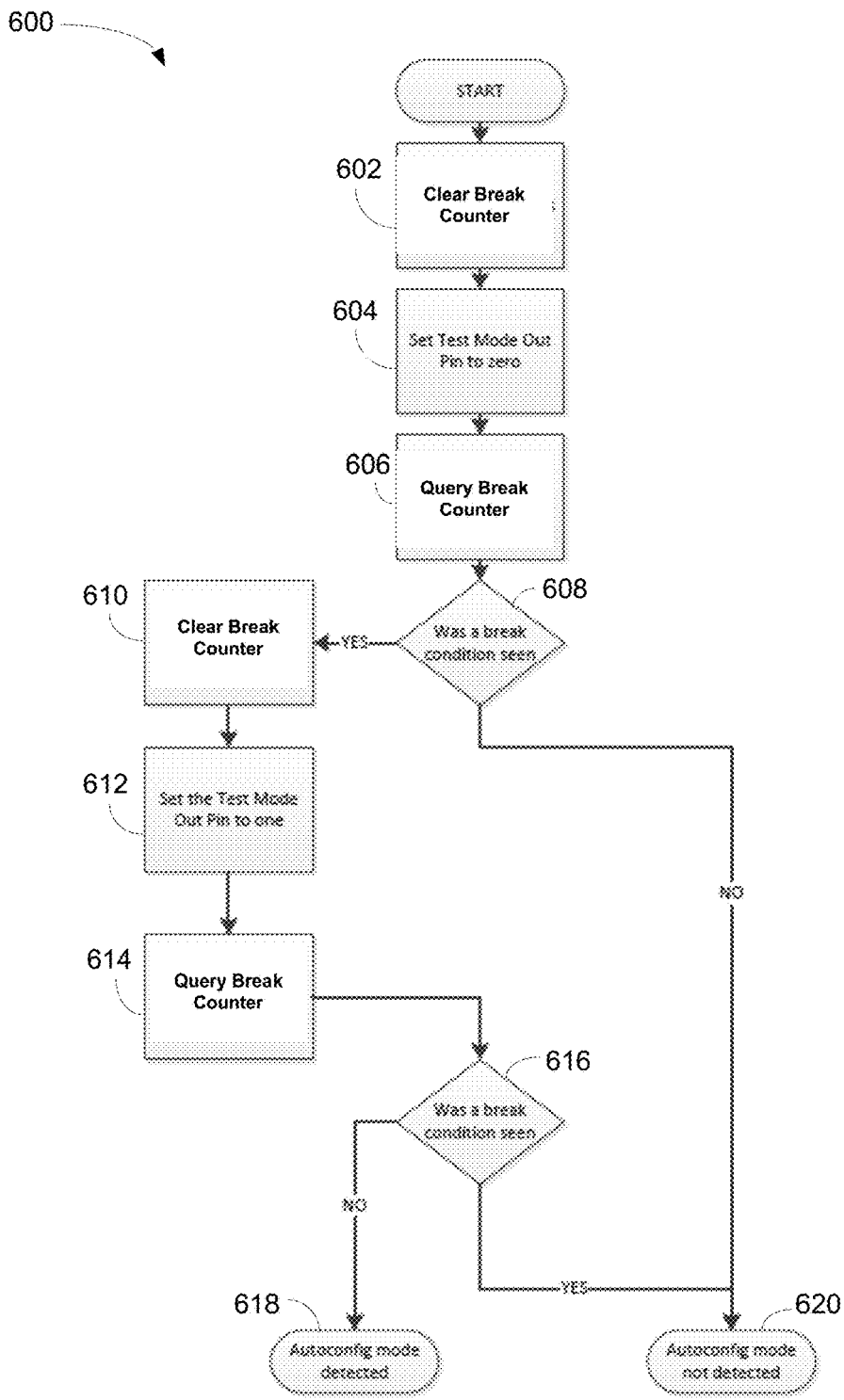
FIG. 6 is a flowchart illustrating a process for initiating an automatic node configuration upon detecting a dongle in accordance with one embodiment of the present invention.

FIG. 6 is a flowchart 600 illustrating a process for initiating an auto-configuration upon detecting a dongle in accordance with one embodiment of the present invention. At block 602, a process capable of configuring an NE resets a counter used to count the number of break conditions detected. After setting a first test signal at the TMO pin of console interface to a logic state zero at block 604, a query of the counter is issued at block 606.

At block 608, if a break condition is detected or seen at the receiver pin of the console interface in accordance with a query of the counter, the process proceeds to block 610 to reset the counter again. After setting a second test signal at the TMO pin to a logic state one at block 612, a query of the counter is again made at block 614. At block 616, if a break condition is not indicated, an auto-configuration mode is activated at the NE at block 618. If the break condition is indicated at block 616, the auto-configuration mode is not entered at block 620. Also, if the break condition is not indicated at block 608, the auto-configuration mode is not entered at block 620.

Figure 7:
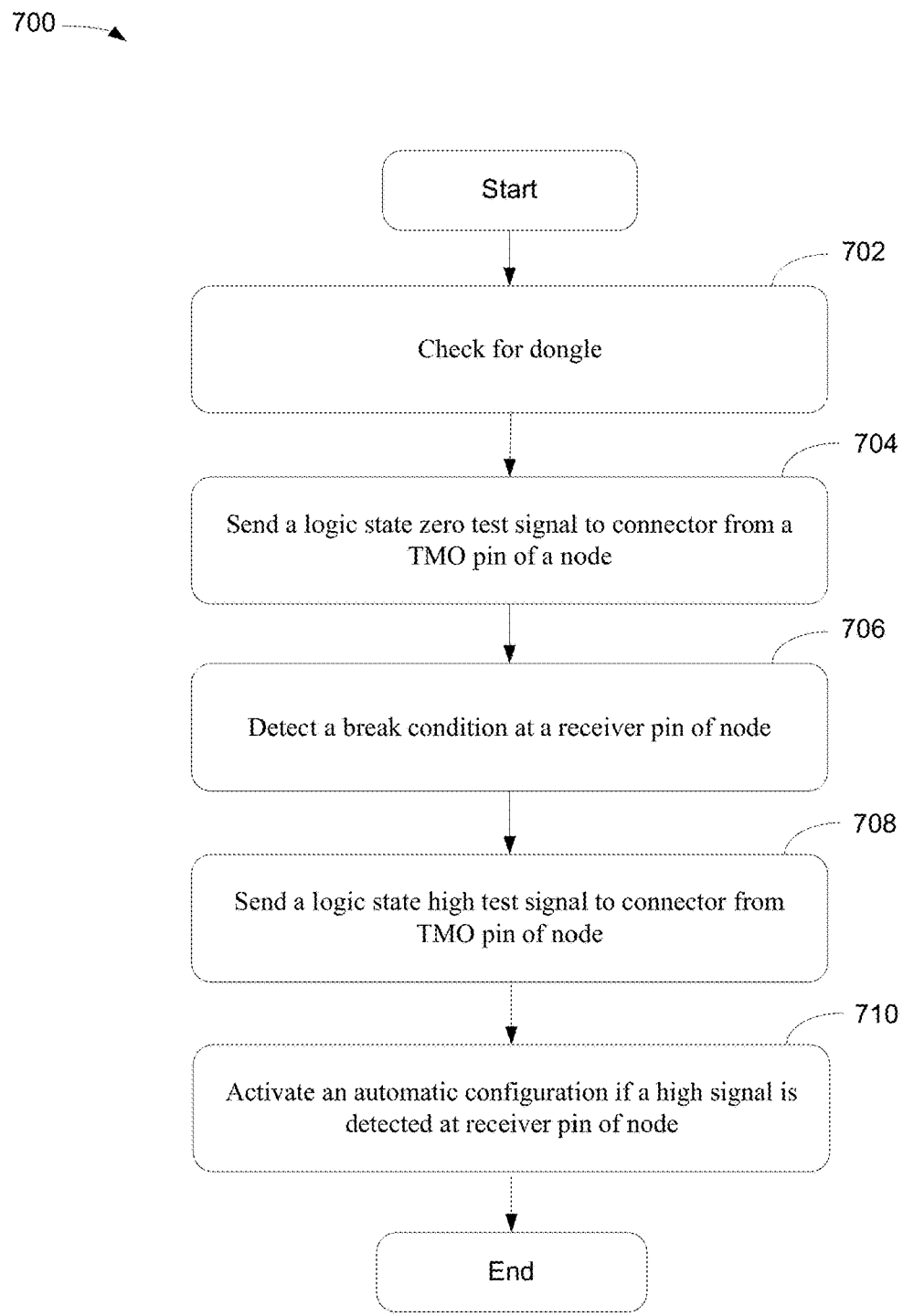
FIG. 7 is a flowchart illustrating an exemplary process for entering automatic configuration mode upon verifying the presence of a dongle in accordance with one embodiment of the present invention.

FIG. 7 is a flowchart 700 illustrating an exemplary process for activating an auto-configuration mode upon verifying the presence of a dongle in accordance with one embodiment of the present invention. At block 702, a module may check to see if a dongle to activate auto-configuration mode may have been inserted into the module. The check may be done, for example, periodically or via a condition that may indicate that a connector has been plugged in. In one example, the process is able to identify a serial communication arrangement in accordance with the RJ45 communication protocol. Alternatively, another communication arrangement in accordance with, for example, a USB 3.0 may be used.

At block 704, logic state zero test signal is sent to the serial communication connector from the TMO pin of the node. For example, a test signal with logic state zero is allowed to flow from the TMO pin of console interface to the receiver pin of the console interface of the node via a connection between the first pin and the second pin of RJ45 plug.

At block 706, a break condition is detected at the receiver pin of the node in response to the logic state zero test signal flowing from the TMO pin to the receiver pin via the first and the second pins of plurality of pins. In one aspect, the process is capable of receiving a logic state zero signal at the receiver pin of the node within a predefined period.

At block 708, a logic state one test signal is sent to the serial communication connector from the TMO pin of the node to the first pin of connector. In one aspect, a break condition counter is reset so that it can be used for counting break conditions at the receiver pin.

At block 710, auto-configuration is activated if a logic state one signal is detected at the receiver pin of the node in response to the logic state one test signal. Alternatively, auto-configuration is not activated if a logic state one test signal is not detected at the receiver pin of the node in response to the logic state one test signal. It should be noted that for this embodiment, transmitting logic state one at the TMO pin is the second stage of verifying the presence of the dongle. There may be more than two stages in the verification process.

It should be noted that the first test signal which creates a break condition at the receiver pin is to determine whether a dongle may be present. The second test signal which is a logic state one is to verify the presence of the detected dongle. Note that additional test signal may be applied to further confirm the presence of a dongle.

Figure 8:
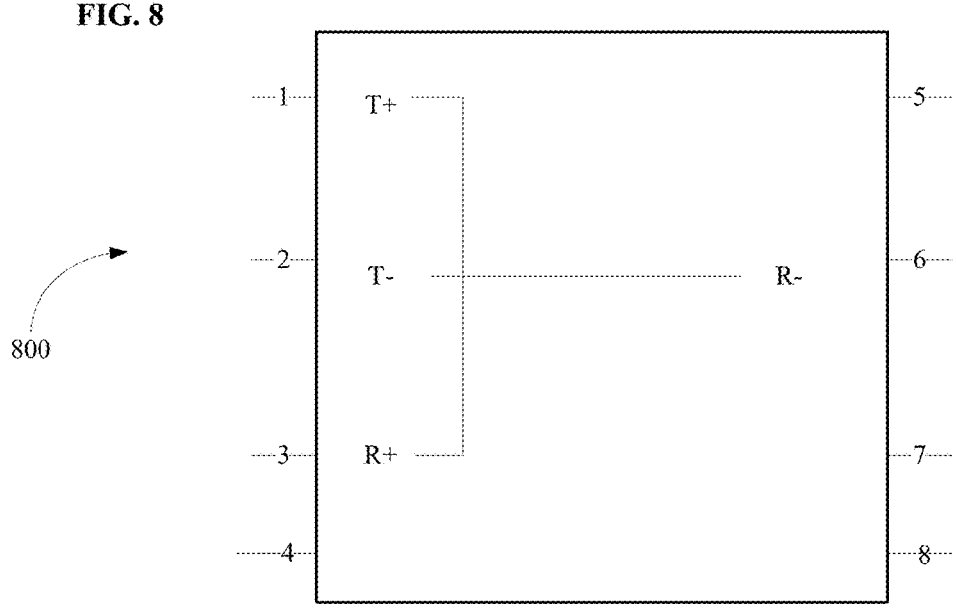
FIG. 8 illustrates an exemplary dongle for a RJ45 connector for a standard Ethernet pinout.

While various embodiments of the invention disclosed detecting a logic state zero then a logic state one, other embodiments may include detecting a logic state one then a logic state zero. Other embodiments of the invention may use other pins as appropriate. For example, for an RJ45 connector, if standard Ethernet pinouts are used, then the TX+ and TX− pins may be looped to the RX+ and RX− pins, respectively, in the dongle. The presence of the dongle may then be verified if the received signals are the same as the transmitted signals. This configuration is shown in FIG. 8 for the RJ45 connector 800.

Additionally, while various embodiments of the invention discuss serial ports, other embodiments of the invention may apply to parallel ports. The presence of a parallel port dongle may be indicated by, for example, sensing input logic states at 2 or more pins that would normally not be in those logic states at the same time. This may cause an interrupt, for example, that will allow verification of whether a dongle is plugged in. Or the parallel port may be monitored periodically to determine if a dongle presence is indicated. The specific method of indicating dongle presence may be design dependent. Upon indication of dongle presence, verification may take place by sending one or more signals via an output pin and detecting the same signals via an input pin, much as described above for the serial ports.

Figure 9:
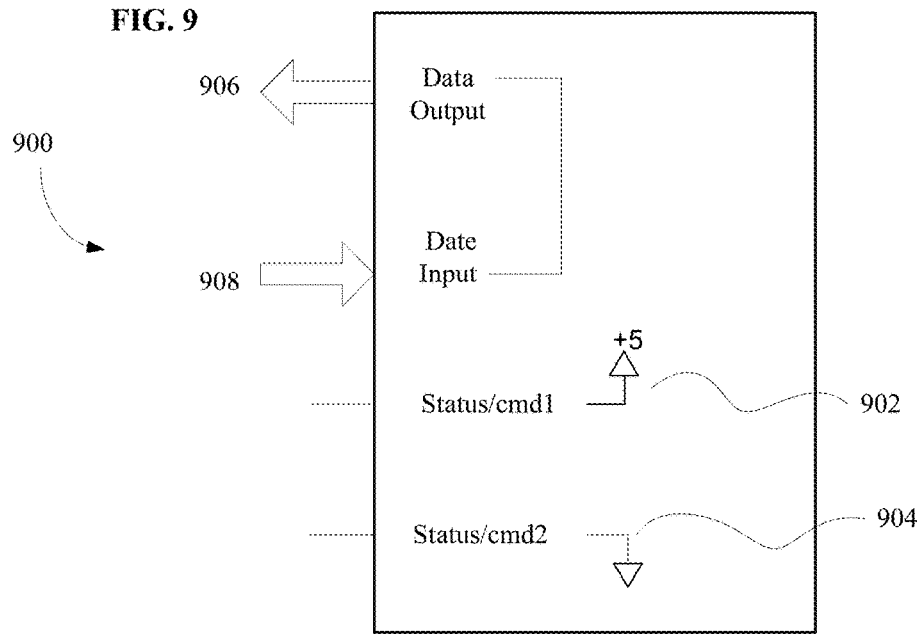
FIG. 9 illustrates an exemplary dongle for a parallel port connector.

An illustration for a parallel connector dongle is shown in FIG. 9. An indication of presence of dongle 900 may be setting at least one status/command line 902 to a logic state one and at least one status/command line 904 to a logic state low where, for example, these status command lines would not normally be in these logic states at the same time. While these specific logic states are stated for illustrative purposes, various embodiments of the invention may select logic states as suited for detecting a dongle presence. In still other embodiments of the invention, for parallel ports where there may be separate data lines for input and output, one or more of the output data lines 906 at the dongle may be electrically connected to a corresponding ones of the input data lines 908 at the dongle. Then data may be output without, for example, asserting status/command line(s) that indicates valid data, and a check may be done to see if the received data is the same as the transmitted data. While the status/command line(s) that indicates valid data may be asserted, not asserting the line(s) would make it more convenient since that would not indicate to a receiving entity (if the receiving entity is connected rather than a dongle) that there is valid data being transmitted.

Figure 10:
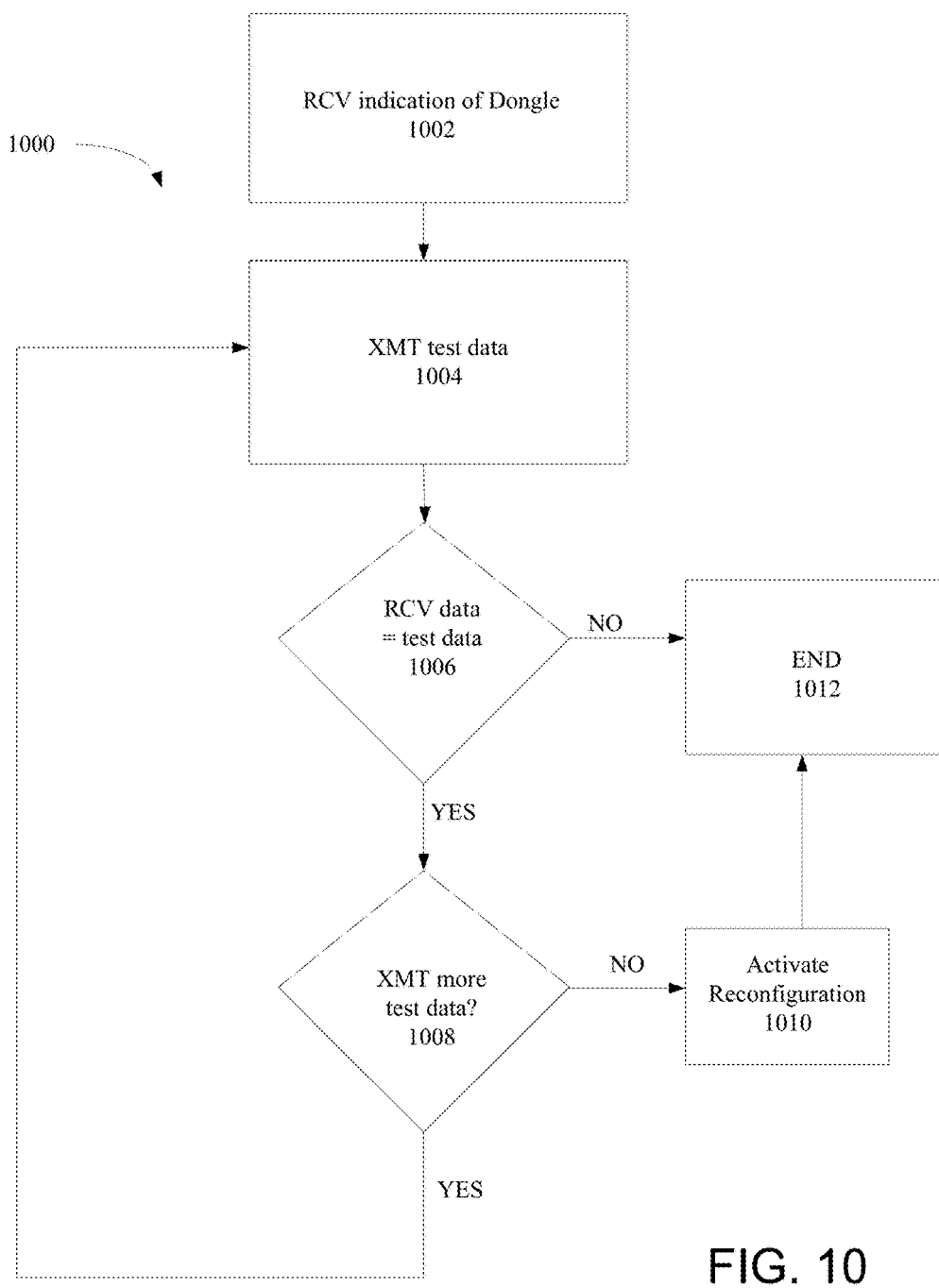
FIG. 10 is a flowchart 1000 illustrating another exemplary process for entering automatic configuration mode upon verifying the presence of a dongle in accordance with one embodiment of the present invention.

FIG. 10 is a flowchart 1000 illustrating another exemplary process for entering auto-configuration mode upon verifying the presence of a dongle in accordance with an embodiment of the present invention. At block 1002, an indication is received that a dongle may be present. At block 1004, test data is transmitted via a first set of pins, where there may be one or more pins in the first set. If there is more than one bit in the test data, the bits are sent in parallel.

At block 1006, data received by a second set of pins is checked to see if it is the same as the test data sent by the first set of pins in block 1004. The second set of pins have at least as many pins as the first set of pins. If the data check at block 1006 fails, then automatic reconfiguration is not activated and the process exits to block 1012. If the data check passes, then the process proceeds to block 1008.

At block 1008, a check is made to see if more test data needs to be sent. If so, then the next test data is sent at block 1004. If not, then reconfiguration is activated at block 1010 and the process exits to block 1012. The number of test data sent is implementation and/or design dependent.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for configuring a network element, comprising:
    inserting an RJ45 plug into a serial communication port ("SCP") of the network element ("NE") to create a connection via the RJ45 plug between a test mode output ("TMO") pin of the SCP and a receiver pin of the SCP, wherein the TMO pin is the $1^{st}$ pin of the SCP, the receiver pin is the $6^{th}$ pin of the SCP, and wherein the TMO pin makes contact with the $1^{st}$ pin of the RJ45 plug, and the receiver pin of the SCP makes contact with the $6^{th}$ pin of the RJ45 plug;
    after resetting a break condition counter to zero, generating, by the NE, a first test signal at the TMO pin to a relatively lower voltage representing a logic state zero;
    detecting a break condition when the receiver pin of the SCP receives the low voltage signal representing the logic state zero for a time period greater than a character length;
    incrementing the break condition counter;
    determining whether a break condition at the receiver pin of the SCP exists by querying the break condition counter;
    after determining the break condition exists, generating a second test signal at the TMO pin to a relatively higher voltage representing a logic state one; and
    activating an automatic configuration mode at the NE when the second test signal representing the logic state one is detected at the receiver pin of the SCP.

2. The method of claim 1, further comprising maintaining the automatic configuration mode inactive as a default mode.

3. The method of claim 1, wherein determining whether a break condition at the receiver pin of the SCP exists includes detecting a logic state zero at the receiver pin of the console interface for a period of time.

4. The method of claim 3, wherein the period of time is a time period sufficient to detect at least a character.

5. The method of claim 1, wherein generating, by the NE, a first test signal at the TMO pin includes setting a logic zero value at the $1^{st}$ pin of the SCP for a predefined period of time.

6. The method of claim 5, wherein determining whether a break condition at the receiver pin of the SCP includes detecting a logic zero at sixth pin of the SCP.

7. A method for activating an automatic configuration mode, comprising:
    plugging a Universal Serial Bus ("USB") plug into a console port of a network element ("NE") to create a connection via the USB plug between a test mode output ("TMO") pin of the NE and a receiver pin of the NE, wherein the TMO pin is the $2^{nd}$ pin of the NE, and the receiver pin of the NE is the $3^{rd}$ pin of the NE, and wherein the TMO pin couples to the $2^{nd}$ pin of the USB plug and the receiver pin couples to the $3^{rd}$ pin of the USB plug;
    after resetting a break condition counter to zero, transmitting a relatively lower voltage representing a logic state zero test signal from the NE to the USB plug via the TMO pin;
    detecting a break condition when the receiver pin of the NE receives the low voltage signal representing the logic state zero for a time period greater than a character length;
    incrementing the break condition counter after detecting an occurrence of the break condition;
    determining whether a break condition at the receiver pin of the NE exists by querying the break condition counter;
    after determining the break condition exists, sending a relatively higher voltage representing a logic state one test signal from the NE to the USB plug via the TMO pin to the $2^{nd}$ pin of the USB plug;
    activating an automatic configuration if the logic state one signal is detected at the receiver pin in response to sending the logic state one test signal via the TMO pin.

8. The method of claim 7, further comprising maintaining an automatic configuration inactive if the logic state one signal is not detected at the receiver pin in response to the logic state one test signal.

9. The method of claim 7, wherein sending a relatively higher voltage representing a logic state zero test signal includes allowing a test signal with logic state zero to flow from the TMO pin to the receiver pin via a connection between the first pin and the second pin of the serial communication connector.

10. The method of claim 7, wherein detecting a break condition includes receiving a logic state zero signal at the receiver pin for a predefined period of time.

11. The method of claim 10, wherein the predefined time is a time length sufficient to detect at least a character.

12. The method of claim 7, wherein sending a relatively higher voltage representing a logic state zero test signal includes forcing a logic zero value at the $2^{nd}$ pin of the console port of the NE.

13. The method of claim 12, wherein detecting a break condition includes detecting a logic zero at the $3^{rd}$ pin of the console port of the NE.

14. A method for configuring a network element ("NE"), comprising:
- plugging a Thunderbolt plug ("plug") into a serial communication port ("SCP") of the NE to create a connection between a $3^{rd}$ ("third") pin of the plug and a $6^{th}$ (sixth) pin of the plug, wherein a test mode output ("TMO") pin of the SCP is located at the $3^{rd}$ pin, and a receiver pin of the SCP is located at the $6^{th}$ pin, wherein the TMO pin makes contact with the $3^{rd}$ pin of the plug, and the receiver pin of the SCP makes contact with the $6^{th}$ pin of the plug;
- after resetting a break condition counter to zero, transmitting a relatively lower voltage representing a logic zero value at the TMO pin of the SCP;
- incrementing a break condition counter when the receiver pin receives the logic zero value for a time period greater than a character length;
- determining whether a break condition at the receiver pin of the SCP exists by querying the break condition counter;
- after determining the break condition exists, generating a relatively higher voltage representing a logic state one value as a high test signal at the TMO pin; and
- activating an automatic configuration mode at the NE when the logic state one value is detected at the receiver pin of the SCP.

15. The method of claim 14, further comprising maintaining the automatic configuration mode inactive as a default mode.

16. The method of claim 14, wherein determining whether a break condition includes detecting a logic state zero at the receiver pin of the console interface for a period of time.

17. The method of claim 16, wherein the period of time is a time period sufficient to detect at least a character.

18. The method of claim 14, wherein plugging an RJ45 plug into a serial communication port ("SCP") of the NE includes inserting the RJ45 plug into a console socket of a router connected to a network node.

* * * * *